INVENTOR
FRANZ DECKERT

ATTORNEYS

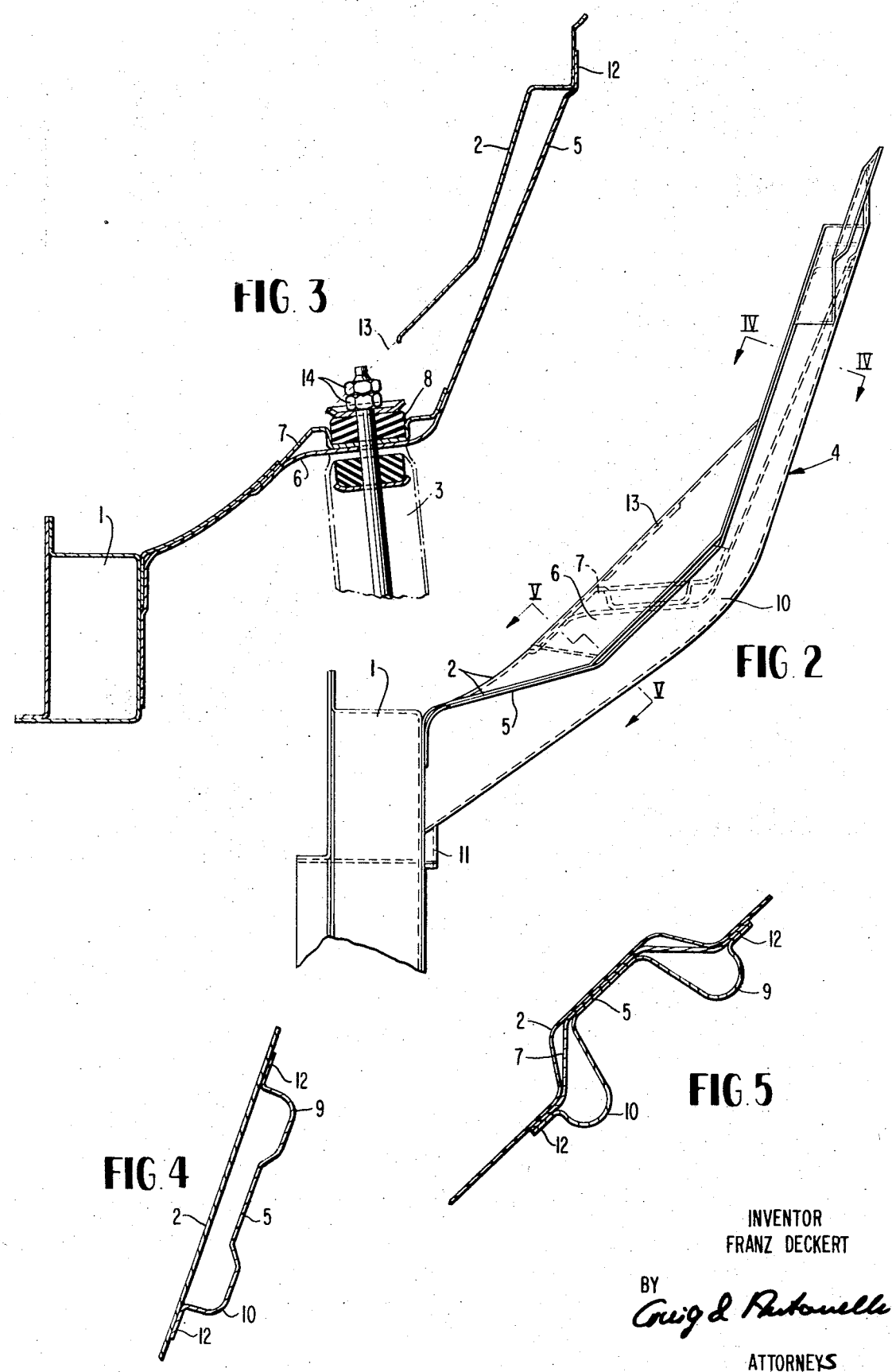

United States Patent Office

3,554,575
Patented Jan. 12, 1971

1

3,554,575
WHEEL MOUNTING FOR MOTOR VEHICLES, ESPECIALLY FOR THE FRONT WHEELS OF PASSENGER MOTOR VEHICLES
Franz Deckert, Sindelfingen, Germany, assignor to Daimler-Benz Aktiengesellschaft, Stuttgart-Unterturkheim, Germany
Filed Nov. 8, 1968, Ser. No. 774,436
Claims priority, application Germany, Nov. 11, 1967, 1,630,384
Int. Cl. B62d 21/00
U.S. Cl. 280—106                                14 Claims

ABSTRACT OF THE DISCLOSURE

A wheel mounting for motor vehicles, especially for the front wheels of passenger motor vehicles which includes a longitudinal bearer and a wheel-casing sheet metal panel laterally adjoining the longitudinal bearer; a bracket is provided for the purpose of mounting the upper end of a shock absorber which extends nearly over the entire height of the wheel-casing panel and which is secured at the longitudinal bearer and at the wheel-casing panel.

---

The present invention relates to a wheel mounting for motor vehicles especially for the front wheels of passenger motor vehicles, which includes a longitudinal bearer and the wheel-casing sheet-metal panel laterally adjoining the same.

Such types of wheel mountings serve, inter alia, for the securing of the upper end of a shock absorber. In order to absorb reliably and safely the forces of the shock absorber which are in part considerable, hollow bearers are provided, for the most part, in the known prior art constructions which are secured at the wheel-casing sheet-metal panels or plates and which extend to the dashboard of the vehicle. The securing of the upper end of the shock absorber takes place at these additional hollow bearers. These prior art constructions entail, however, the disadvantage that they are complicated in their manufacture and therewith costly and, above all, do not possess any direct connection to the forward longitudinal bearer.

The present invention aims at creating a wheel mounting of the aforementioned type, in which the forces transmitted by the shock absorber can be safely absorbed and which is characterized by a simple manufacture. The present invention essentially monsists in that for the mounting of the upper end of a shock absorber, a bracket extending over approximately the entire height of the wheel-casing sheet-metal panel is provided which is secured at the longitudinal bearer, disposed lower than the bracket, and at the wheel-casing sheet-metal panel. The forces stemming from the shock absorber are distributed by this bracket in an extraordinarily advantageous manner to the sheet-metal panels of the wheel mounting and are transmitted to the longitudinal bearer.

Advantageously, a sheet-metal plate abutting against the wheel-casing sheet-metal panel from below, may serve as bracket which sheet-metal plate is provided approximately in its center with an upwardly directed embossment forming a mounting for the shock absorber. An extraordinarily advantageous type of construction of the bracket is achieved if laterally of the embossement serving for the accommodation and mounting of the shock absorber, additional embossments are provided which adjoin the inclined parts thereof and form together with the wheel-casing sheet-metal panel, hollow bodies extending in the vertical direction. The forces of the shock absorber which may assume considerable magnitudes above all in the vertical direction, are transmitted from the inclined portions of the embossment, serving for the mounting of the

2 shock absorber directly to the longitudinal bearer by way of the hollow bodies. The embossments extending in the vertical direction may be provided appropriately with apertures or openings at the lower ends thereof in order to create a water discharge.

The embossment serving for the mounting of the shock absorber may be covered off advantageously by means of a reinforcing sheet-metal plate or panel. The reinforcing sheet metal plate or panel may be provided with a pot-like recess for the rubber cushion of the shock absorber.

In a structurally simple manner, the bracket may be fastened by means of a peripheral rim at the wheel-casing sheet-metal panel and at the longitudinal bearer by spot-welding.

According to a further feature of the present invention, provision may be made that the upper end of the bracket is connected with the dashboard or fire wall of the vehicle by way of a bearer. Such a construction is appropriate above all in connection with larger types of vehicles because it enables the safe absorption of very large forces.

Accordingly, it is an object of the present invention to provide a wheel mounting for motor vehicles, especially for the front wheels of passenger motor vehicles, which avoids by simple means the aforementioned shortcomings and drawbacks encountered in the prior art.

Another object of the present invention resides in a wheel mounting of the type described above which is simple in construction and involves relatively low cost in manufacture and assembly.

A further object of the present invention resides in a wheel mounting for the front wheels of passenger motor vehicles which assures a safe and reliable absorption of all forces that occur at the shock absorber.

A still further object of the present invention resides in a wheel mounting of the type described above in which the forces occurring at the shock absorber are safely transmitted not only to the wheel casing but also directly to the longitudinal bearer of the vehicle to assure proper distribution of these forces.

These and further objects, features, and advantages of the present invention will become more obvious from the following description when taken in connection with the accompanying drawing which shows, for purposes of illustration only, one embodiment in accordance with the present invention, and wherein:

FIG. 2 is a front elevational view of the wheel mounting of FIG. 1 as viewed in the vehicle longitudinal direction;

FIG. 3 is a cross-sectional view taken along line III—III of FIG. 1;

FIG. 4 is a cross-sectional view taken along line IV—IV of FIG. 2; and

FIG. 5 is a cross-sectional view taken along line V—V of FIG. 2.

Figure 1:
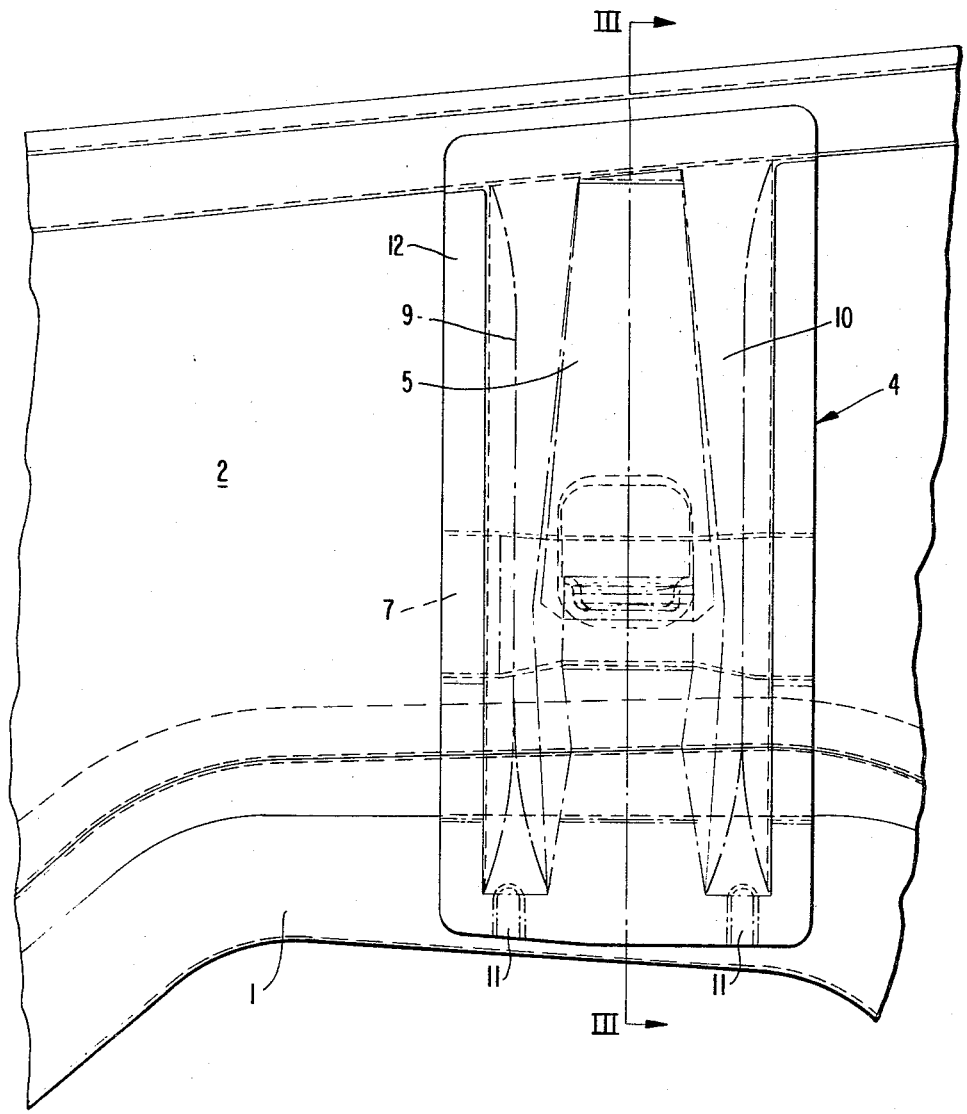
FIG. 1 is a side elevational view of a wheel mounting in accordance with the present invention.

Referring now to the drawing wherein like reference numerals are used throughout the various views to designate like parts, the wheel mounting illustrated in the drawing consists of a longitudinal bearer 1 composed of sheet metal profiles and disposed relatively low which is adjoined by a wheel-casing sheet metal panel 2 directed outwardly at an inclination. Among others, the upper end of a shock absorber 3 (FIG. 3) has to be secured at the wheel mounting intended for the accommodation of a front wheel of a passenger motor vehicle. Considerable forces, especially tensional forces of approximately 1,000 kg. are transmitted by this shock absorber 3, which have to be reliably absorbed by the construction.

A bracket generally designated by reference numeral 4 is provided for the mounting of the upper end of the shock absorber 3; the bracket 4 extends approximately over the entire height of the wheel-casing sheet-metal panel 2 and is secured at the longitudinal bearer 1. The bracket 4 consists of a sheet-metal plate 5 which abuts from below against the wheel-casing sheet-metal plate 2. Approximately in its center, this sheet-metal plate 5 is provided with an upwardly directed embossment or bent-out portion 6 which is intended for the accommodation and mounting of the shock absorber 3. This embossment 6 is provided with a reinforcing sheet-metal panel or plate 7 that has a pot-shaped recess for the accommodation of the rubber cushion 8 serving for the mounting of the shock absorber end 3. The reinforcing sheet-metal panel or plate 7 extends over the entire width of the sheet metal plate 5 serving as bracket 4 so that the forces of the shock absorber 3 are well distributed.

The sheet metal plate 5 is additionally provided with two further embossments or stamped-out portions 9 and 10 which extend in its longitudinal direction. These two embossments 9 and 10 form together with the wheel-casing sheet-metal plate 2, after the installation of the sheet metal plate 5, hollow bodies extending in the vertical direction which exhibit a considerable rigidity and which further transmit the forces produced by the shock absorber 3 to the longitudinal bearer 1. The two embossments 9 and 10 which extend up to the longitudinal bearer 1 are provided at the lower ends thereof with apertures 11 which serve as water discharge or drainage means.

The bracket 4 consisting of the sheet-metal plate 5 is provided with a peripheral rim 12 that is matched to the contour of the longitudinal bearer 1 and to the shape of the wheel-casing sheet-metal panel 2. The bracket 4 is fastened by spot welding by means of this peripheral rim 12 both at the longitudinal bearer 1 as also at the wheel-casing sheet-metal panel 2. The reinforcing sheet-metal panel 7 disposed partly between the wheel-casing panel 2 and the bracket 4 is also secured at the bracket 4 by spot welding.

The wheel-casing sheet-metal panel 2 provided within the area of the upper end of the shock absorber 3 with an embossment is provided directly above the shock absorber 3 with an aperture 13 so that the mounting bolts 14 for the shock absorber 3 can be installed.

As shown in FIGS. 4 and 5, the bracket 4 forms together with the wheel-casing sheet-metal panel 2 by means of the two embossments or bent-out portions 9 and 10 one hollow body within the area above the shock absorber 3 whereas within the area below the shock absorber 2 two mutually separated hollow bodies are formed thereby.

By the mounting of such a bracket 4, the forces of the shock absorber 3, on the one hand, are distributed in an extraordinarily advantageous manner with the smallest possible structulral expenditures over a large surface of the wheel-casing sheet metal panel 2 and, on the other, are transferred in an extraordinarily advantageous manner directly to the longitudinal bearer 1.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A wheel mounting for motor vehicles, especially for the front wheels of passenger motor vehicles which includes longitudinal bearer means and wheel-casing panel means laterally adjoining the same, characterized by bracket means for the mounting of the upper end of a shock absorber, said longitudinal bearer means being disposed lower than said bracket means, and said bracket means extending approximately over the entire height of the wheel-casing panel means and being secured both at the longitudinal bearer means and at the wheel-casing panel means, wherein a sheet-metal plate means serves as bracket means and abuts from below against the wheel-casing panel means, the sheet metal plate means being provided approximately in its center with upwardly directed embossment means forming a mount means for the shock absorber.

2. A wheel mounting according to claim 1, wherein said embossment means includes inclined portions, and further embossment means provided laterally of said inclined portions which, together with the wheel-casing panel means, form hollow body means extending approximately in the vertical direction.

3. A wheel mounting according to claim 2, wherein the further embossment means extending approximately in the vertical direction are provided at the lower ends thereof with aperture means to enable discharge of water.

4. A wheel mounting according to claim 3, further comprising reinforcing plate means covering the embossment means serving for the shock absorber mounting.

5. A wheel mounting according to claim 4, wherein the reinforcing plate means is provided with pot-like recess means for accommodating rubber cushion means of the shock absorber.

6. A wheel mounting according to claim 1, wherein said wheel-casing panel means and said longitudinal bearer means are made from sheet-metal.

7. A wheel mounting according to claim 6, wherein the bracket means is provided with a peripheral rinm portion secured by spot welding at the wheel casing panel means and at the longitudinal bearer means.

8. A wheel mounting according to claim 7, wherein the upper end of the bracket means is connected by way of a further bearer means.

9. A wheel mounting according to claim 1, further comprising reinforcing plate means covering the embossment means serving for the shock absorber mounting.

10. A wheel mounting according to claim 9, wherein the reinforcing plate means is provided with pot-like recess means for accommodating rubber cushion means of the shock absorber.

11. A wheel mounting according to claim 5, wherein the bracket means is provided with a peripheral rim portion secured by spot welding at the wheel casing panel means and at the longitudinal bearer means.

12. A wheel mounting according to claim 11, wherein said embossment means includes inclined portions, and further embossment means provided laterally of said inclined portions which, together with the wheel-casing panel means, form hollow body means extending approximately in the vertical direction.

13. A wheel mounting according to claim 12, further comprising reinforcing plate means covering the embossment means serving for the shock absorber mounting.

14. A wheel mounting according to claim 1, wherein the upper end of the bracket means is connected by way of a further bearer means.

References Cited

UNITED STATES PATENTS

| | | | |
|---|---|---|---|
| 3,169,026 | 2/1965 | Soer | 280—106.5 |
| 2,876,018 | 3/1959 | Kishline | 280—106.5 |
| 2,299,926 | 10/1942 | Phelps | 280—106.5 |

PHILIP GOODMAN, Primary Examiner

U.S. Cl. X.R.

280—106.5